United States Patent [19]

Lau

[11] 4,000,512
[45] Dec. 28, 1976

[54] WIDTH MODULATED MAGNETIC RECORDING

[75] Inventor: Edward H. Lau, Old Westbury, N.Y.
[73] Assignee: Redactron Corporation, Hauppauge, N.Y.
[22] Filed: Dec. 17, 1975
[21] Appl. No.: 641,609
[52] U.S. Cl. .................................... 360/45; 360/44
[51] Int. Cl.² ......................................... G11B 5/09
[58] Field of Search .............................. 360/44, 45

[56] References Cited

UNITED STATES PATENTS

| | | | |
|---|---|---|---|
| 3,067,422 | 12/1962 | Hunt | 360/45 |
| 3,281,806 | 10/1966 | Lawrance et al. | 360/44 |
| 3,488,662 | 1/1970 | Vallee | 360/45 |
| 3,879,342 | 4/1975 | Patel | 360/45 |
| 3,930,265 | 12/1975 | Kimura | 360/45 |

*Primary Examiner*—Vincent P. Canney
*Attorney, Agent, or Firm*—Hane, Sullivan & Spiecens

[57] ABSTRACT

In a system for recording bits in elements along a moving magnetic medium wherein a first valued bit is represented by a pulse of a first width, length or duration, and a second valued bit is represented by a pulse of a second width, length or duration, there is included the improvement of changing either the first width or said second width when the bit to be recorded and the bit previously recorded have the same value.

6 Claims, 5 Drawing Figures

MAGNETIC RECORDING SYSTEM    MRS"

WIDTH MODULATED MAGNETIC RECORDING

BACKGROUND OF THE INVENTION

This invention pertains to magnetic recording and more particularly to the magnetic recording of bits by different width pulses.

There have recently become available inexpensive magnetic tape cassette-systems where the speed of the tape past the read/record head can vary over considerable limits. In order to make the interpretation of the data selfclocking there has been proposed a recording scheme wherein in effect the width of the pulse within a bit cell represents the data bit, i.e., if the cell or element has one width it represents a binary one and if it has another width it represents a binary zero. This representation is disclosed in U.S. Pat. Nos. 2,887,674 and 3,720,927. While the former patent shows the generation of such a waveform it is speed sensitive since data recovery relies on sampling utilizing fixed and invarient time intervals which cannot be changed even if the speed of the tape changes.

On the other hand, U.S. Pat. No. 3,720,927 teaches a substantially speed insensitive system since the data is interpreted by utilizing the ratio of the time between the start of the data cell and the transition between states of magnetization and the time between the transition and the end of the data cell. However, this latter patent can only reliably distinguish between the two possible bits as long as the bits are not too closely packed.

SUMMARY OF THE INVENTION

It is accordingly a general object of the invention to provide magnetic recording techniques which not only have a selfclocking feature and are speed insensitive, but also have greater packing densities than normally available.

In general, the invention contemplates improving the known scheme of magnetically recording binary data in the form of first and second types of bits in bit elements longitudinally along a moving magnetic medium wherein each bit element has a first region having a first polarity of magnetization and a second region having a second polarity of magnetization, the first type of bit being represented when the first region is longer than the second region, and the second type of bit being represented when the first region is shorter than the second region. The improvement is accomplished by changing the time duration for recording one of the regions of the bit element associated with the bit being recorded when at least the previously recorded bit and the bit to be recorded are of the same type.

DETAILED DESCRIPTION

Figure 1:
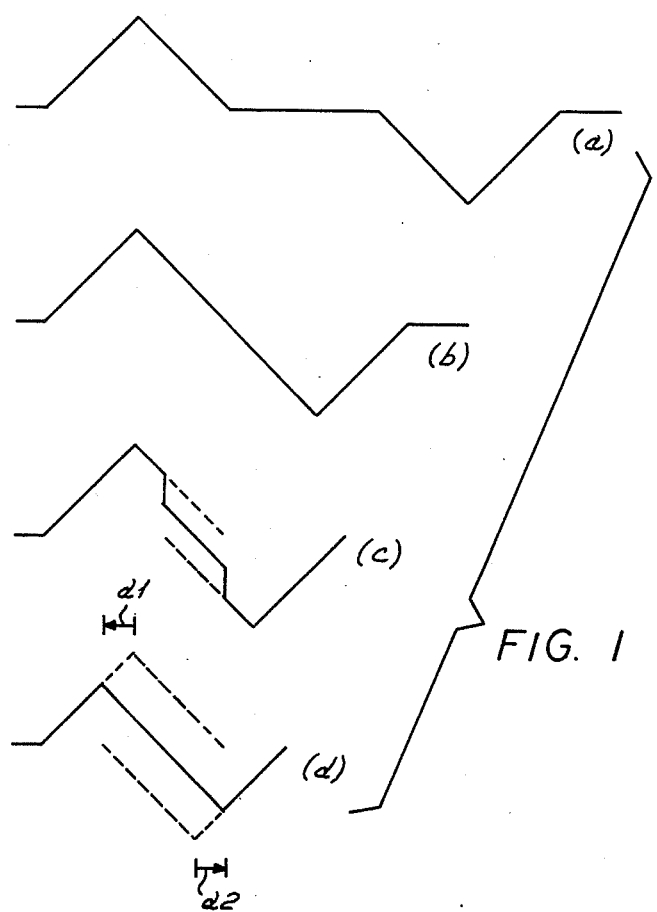
FIG. 1 shows idealized playback waveforms of various width pulses.

When recording and recovering (reproducing) binary data from a magnetic medium wherein the data is represented by pulses having a high density, a playback peak shifting phenonomen occurs because of pulse crowding. In FIG. 1 a there is shown an idealized reading or recovery waveform for a positive followed by a negative flux transition at low bit element or data cell density. The area and width or length of each pulse is primarily dependent on the read head's gap length and the magnetic tape's resolution. FIG. 1 b shows the minimum separation of the transitions without any interaction between the transitions. In FIG. 1 c there is shown the resultant readback waveform for a recording at two-thirds the period of that of FIG. 1b. Note in FIG. 1 d the resultant waveform is for a recording at three times the frequency as that of FIG. 1b. Note the arrows d1 and d 2 indicate the shifting of the peaks from their normally expected positions.

The most common recovery technique used by magnetic tape readback amplifiers utilizes peak detection of the reading waveform since the peaks are the most invarient characteristic of the waveform if density considerations are carefully observed. In U.S. Pat. No. 3,720,927 by utilizing the above mentioned ratio techniques there is taught a cost effective way to recover data over very wide speed variations. However, the speed variations affect the peak shifts shown in FIG. 1 d for higher densities of recording and result in readback ratios approaching 1:1.

Figure 2:
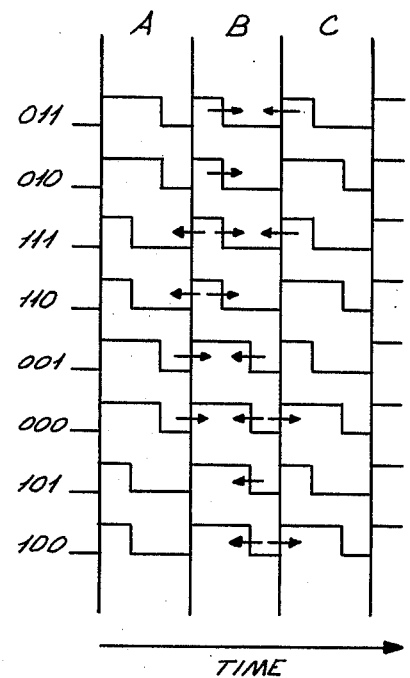
FIG. 2 shows idealized recording waveforms for various combinations of three bits.

In FIG. 2 there are shown three adjacent bit elements or data cells A, B and C and the idealized waveforms recorded in these cells for all combinations of three successive bits. The convention is that a binary zero 0 is represented by a positive magnetization for two-thirds of the cell followed by a transition to a negative magnetization which then is present for the remaining one-third of the cell; and a binary one 1 is represented by a positive magnetization of one-third of the cell and a negative magnetization for the remaining two-thirds of the cell. Thus, the nominal ratio difference between binary ones and zeros is two to one.

Consider now cells B for each of the eight possible combinations. It is seen that as the density increases certain transitions interact and urge the peaks to shift in the directions indicated by the arrows.

If one assumes a data cell has a length of nominally twelve units then an ideal cell storing a binary zero would have a ratio of positive to negative magnetization of 8 to 4 and a binary one would have a ratio of 4 to 8. When one realizes that the ratios are primarily determined by the spacing between the playback peaks and if there is a one-twelfth error because of peak shifts, the following ratios are obtained by the B cells.

Table I

| Three bit combination | Apparent Intervals in B Cell | |
|---|---|---|
| | Positive | Negative |
| 011 | 5 | 6 |
| 010 | 5 | 7 |
| 111 | 6 | 6 |
| 110 | 6 | 7 |
| 001 | 6 | 5 |
| 000 | 6 | 6 |
| 101 | 7 | 5 |
| 100 | 7 | 6 |

Note none of the apparent intervals are the ideal 8 to 4 or 4 to 8. In fact, it is seen that the B cell for the combinations 111 and 000 can have three errors, for the combinations 011, 110, 001 and 110 can have two errors, and the combinations 010 and 101 can have one error.

It should be noted that when the ratio recovery technique is used then one cannot detect the value of the B cell for the combinations 111 or 000 because both show a 1:1 ratio.

Hence, in order to maintain the highest possible packing density with still an unambiguous ratio, the B cell "geometry" of the combination 111 must be changed. The negative or second half can be lengthened and less desirably, the positive or first half can be shortened. Similarly for the combination 000, the negative or second half can be shortened or more desirably the positive or first half can be lengthened. The shortening or lengthening occurs when recording the data bits. It is easily controllable by monitoring the data stream for the value of the data bit just recorded (A cell), the data bit to be recorded (B cell) and the data bit next to be recorded (C cell). In fact, if one is willing to sacrifice some density, it is only necessary to monitor the data bit just recorded (A cell) and the data bit to be recorded (B cell) for identity. In this case, the 000 and 111 combinations are compensated along with the 110 and 001 combinations which didn't actually need compensation.

Figure 3:
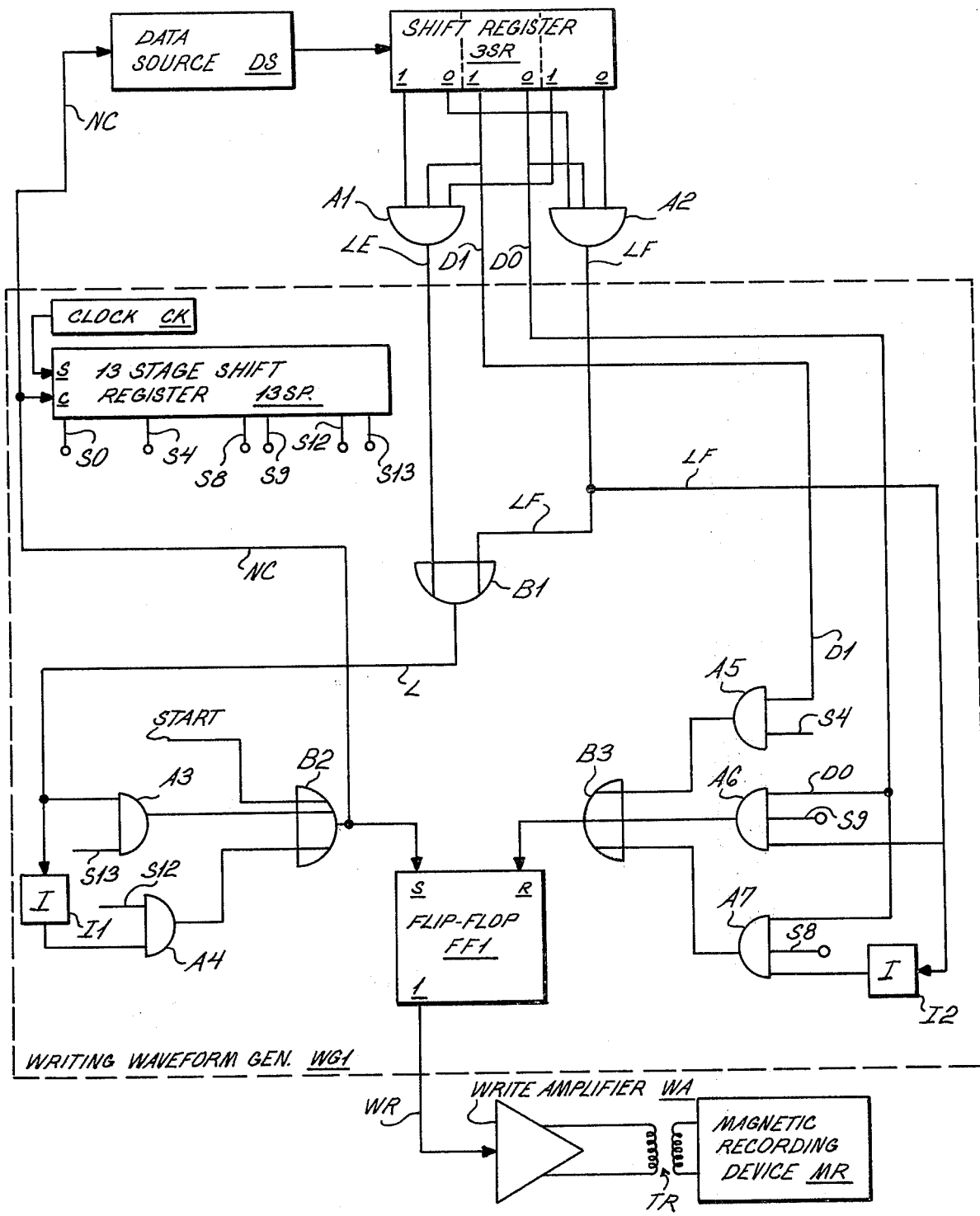
FIG. 3 shows a block diagram of a magnetic recording system utilizing one embodiment of the invention.

There are several ways of implementing apparatus to perform the anticipatory compensations. FIG. 3 shows a magnetic recording system MRS wherein three successive bits are simultaneously monitored so that if the combination 000 arises, the first part of the B cell is lengthened while if three successive bits are 111 the second part of the B cell is lengthened.

In particular, the data bits are sequentially fed from data source DS to three stage shift register SR, a bit being emitted in response to a signal on line NC. If the data bit present in the middle stage of the shift register is a binary one it is fed via line D1, and if a binary zero it is fed via line D0 to writing waveform generator WG1. In addition, if shift register SR contains the combination 111, this is detected by AND-circuit A1, having three inputs respectively connected to the 1-outputs of the stages of the shift register SR, which transmits a high signal on line LE to writing waveform generator WG1. Similarly, if shift register SR contains the combination 000, this is detected by AND-circuit A2, having three inputs respectively connected to the 0-outputs of the stages of the shift register SR, which transmits a high signal on line LE to writing waveform generator WG1.

The writing waveform generator WG1 processes the signals on lines D0, D1, LE and LF to generate a writing voltage having a waveform similar to that shown in FIG. 2 except for the compensating shifts of the transitions. The writing voltage is fed via line WR to write amplifier WA where it is converted to a writing current which is fed via transformer TR to a magnetic head positioned opposite a moving magnetic tape in magnetic recording device MR.

The writing voltage is generated by flip-flop FF1 whose 1-output is connected to line WR. The flip-flop is switched between set and reset states at times determined by the data bits to be recorded.

The reset terminal of flip-flop FF1 is connected to the output of three input OR-circuits B3 whose inputs are connected to the outputs of AND-circuits A5, A6 and A7. AND-circuit A5 has its two imputs connected respectively to lines D1 and S4. AND-circuit A6 has its three inputs connected to lines LF, S9 and DO respectively. AND-circuit A7 has its three inputs connected to lines D0 and S8, and via interver I2 to line LF.

The set terminal S of the flip-flop FF1 is connected to the output of three input OR-circuit B2 which is also connected to line NC. The first input of OR-circuit B2 is connected to a START signal line for starting the operation. The second input is connected to the output of AND-circuit A3 whose inputs are connected to line S13 and via line L to the output of two input OR-circuit B1 which receives signals on lines LE and LF. The third input of OR-circuit B2 is connected to the output of AND-circuit A40 whose two inputs are connected to line S12 and via inverter I1 to line L.

The timing of the transitions in the write voltage is clocked by 13 stage shift register 13SR which is stepped in response to pulses received at input S from clock CK to emit pulses of lines S4, S8, S9, S12 and S13, and which is cleared by a pulse at input C connected to line NC. In effect, clock CK and register 13SR divide a data cell into either twelve or 13 increments. A pulse occurs on one of the line Sn (where n= 4,8,9,12 and 13) n increments after the start of a cell as determined by a pulse on line NC.

Normally, a pulse occurs on line NC at the end of the previous data cell. At the start of operations a pulse on line START provides the pulse for line NC. The pulse on line NC sets flip-flop FF1 causing line WR to go high, clears register 13SR to stage SO indicating the start of a data cell and triggers data source DS to send another bit to shift register 3SR. Assume that bits are in all three stages of shift register. Several cases arise. If the center stage holds a binary one regardless of what the other two stages hold, then line D1 will be high and after the fourth clock pulse from the clearing of the register 13SR to state SO, the register will be in state S4 emitting a signal onto line S4. Accordingly, flip-flop FF1 is cleared and line WR goes low after having been high for four increments of time (a first time duration has been generated). Now, if the center state of flip 3SR holds binary one and either of the other stages holds a binary zero, then when register 13SR is in stage S12, twelve increments after the start of the cell, the signal on line S12 will pass through AND-circuit A4 and OR-circuit B2 to give a pulse on line NC to start a new recording cycle. In this case the second time duration is eight increments long (from state S4 to state S12.) If, however, binary ones were in all three stages of shift register 3SR, the signal on line LE would be high, opening AND-circuit A3 and blocking AND-circuit A4. Then thirteen increments from the start of the cell, the signal on line S13 will pass through AND-circuit A3 and OR-circuit B2 or give a pulse on line NC and start a new cycle. In this case the second time duration is increased from its normal eight increments to nine increments (from states S4 to S13).

If, however, the bit in the middle stage of shift register 3SR is a binary zero, then two possibilities arise. The cell again starts a state SO, but, if a binary one is in either of the other stages then when registered 13SR reaches stage S8 (eight increments) from the start of the cell, AND-circuit A7 passes a pulse via OR-circuit B3 which restores flip-flop FF1 causing the voltage on line WR which had been high for eight increments to now go low. Then after the twelfth increment when register 13SR is in state 12 the signal on line S12 passes through AND-circuit A14 and OR-circuit B2 to line NC to start a new cycle. In this case the second part of the cell is low for four increments. If, however, there were three binary zeros stored in shift register 3SR, then nothing would have happened at the eight increment, but at the ninth increment the signal on line S9 would pass through AND-circuit A6 and OR-circuit B3 to restore flip-flop FF. Thus, line WR will have been high for nine increments. Then at the thirteenth increment, the combinations of high signals on line S13 and L at AND-circuit A3 cause the line NC to go high starting a new cycle. In this case the second time interval was four increments, i.e., from state S9 to state S13.

Figure 4:
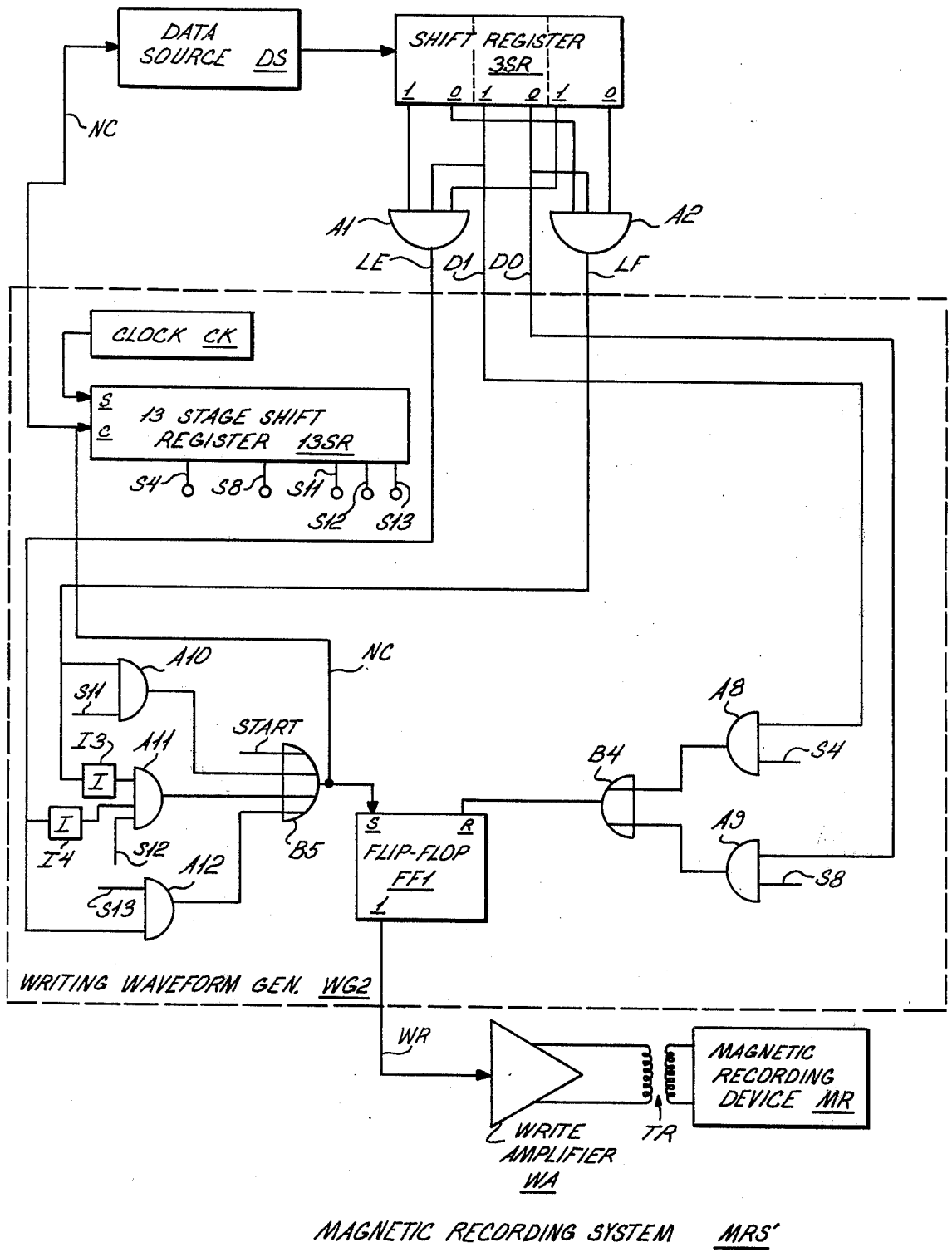
FIG. 4 shows a block diagram of a magnetic recording system utilizing another embodiment of the invention.

The second way to perform the compensation is to lengthen the second part of the cell if there are three binary zeros in series and to shorten the second part of the cell if there are three binary zeros in series. The magnetic recording system MRS of FIG. 4 utilizes this technique and is identical to many portions of system MRS shown in FIG. 3. Since there are many similarities, the same reference characters will be used for line units and only the differences will be discussed in detail. In particular, the differences merely center around the setting and restoring of flip-flop FF1. The flip-flop is set by a pulse on line NC as described above to indicate the state SO for a new cell. If the bit to be recorded is a binary one as indicated by the signal on line D1 being high, then at state S4, the signal on line S4 passes through AND-circuit A8 and OR-circuit B4 to restore flip-flop FF1 ending the first time interval which is four increments long. If, however, the bit to be recorded is a binary zero as indicated by the high signal on line DO, then at state S8 the signal on line S8 will pass through AND-circuit A9 and OR-circuit B4 to restore flip-flop FF1, terminating the first time interval of the cell at eight increments. Note, the first time interval of the cell will always either be four or eight increments and never lengthened or shortened for compensation. All compensation occurs for the second time interval of the cell.

If the three successive bits are not alike no compensation takes place and at state S12 the signal on line S12 passes through AND-circuit A11. Note the outputs of inverters I3 and I4 are high since the signals on lines LE and LF are low because the AND-circuit A1 is not detecting all binary ones and the AND-circuit A2 is not detecting all binary zeros.

When AND-circuit A1 detects all binary ones the signal one line LE is high, blocking AND-circuit A11 and opening AND-circuit A12. Thus, at state S13, nine increments after the end of the first interval associated with the recording of a binary one, the signal on line S13 passes through AND-circuit A12 and OR-circuit B5 to generate a signal on line NC to start a new cycle. However, when AND-circuit A2 detects all binary zeros, the signal on line LF is high, blocking AND-circuit A11 but opening AND-circuit A10. Thus, at state S11 three increments after the end of the first interval associated with the recording of a binary zero, the signal on line S11 passes through AND-circuit A10 and OR-circuit B5 to generate a signal on line NC to start a new cycle.

Figure 5:
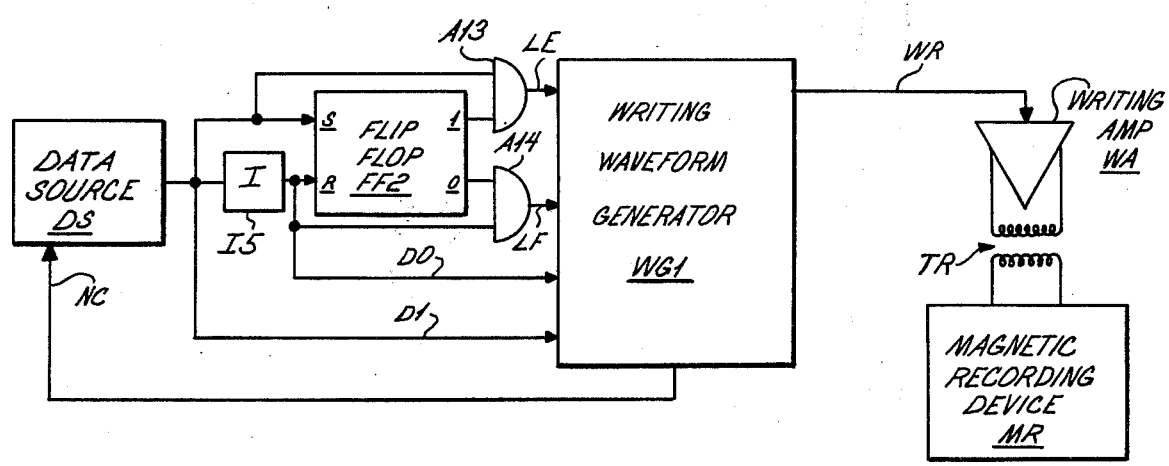
FIG. 5 shows a block diagram of a magnetic recording system utilizing yet another embodiment of the invention.

As stated above, it is not necessary to sample three successive bits to perform the compensation if one is willing to have a slightly lower packing density. This is accomplished by merely sensing for equality between the bit to be recorded and the bit just previously recorded and performing the same compensations as described above. FIG. 5 shows apparatus for accomplishing such a result in the form of a magnetic recording system which is identical to that of FIG. 3 except that the shift register 3SR and the AND-circuits A1 and A2 for generating signals on lines LE, LF, D1 and D0 in response to bits from source DS are replaced. In particular, data source DS now feeds directly line D1, feeds the input of inverter I5 having an output connected to line D0, feeds an input to AND-circuit A13 and the set input of flip-flop FF2. The output of inverter I5 feeds the clear terminal R of flip-flop FF2 and an input of AND-circuit A14. The 1 output of flip-flop FF2 is coupled to the second input of AND-circuit A13 whose output is connected to line LE, and the 0 output of flip-flop FF2 is coupled to the second input of AND-circuit A14 whose output is connected to line LF. Thus, if a binary one follows a binary one, flip-flop FF2 being set by the first binary one "gates" the second binary one through AND-circuit A13 causing line LE to be high. Similarly, if a binary zero follows a binary zero, the first binary zero restoring flip-flop FF2 whose 0 output opens AND-circuit A14 permitting the inverted second binary zero to pass from the output of inverter I5 through AND-circuit A14 to line LF. If the two successive bits are different it is evident that the signals on lines LE and LF are low. Although the waveform generator WG1 is preferred for the system of FIG. 5 the waveform generator WG2 of FIG. 4 can also be used.

While only a limited number of embodiments have been shown and described in detail, there will now be obvious to those skilled in the art many modifications and variations satisfying many or all other objects of the invention, but which do not depart from the spirit thereof as defined by the appended claims. For example, the dividing of the bit of data cells in twelve increments is merely representative and other increments could be used. In addition, the time durations were generated by the controlled turning on and off of a flip-flop in conjunction with a shift register. One could use other types of timing devices, such as the one shot multivibrators shown in U.S. Pat. No. 2,887,674. One could also use such one shot multivibrators in the manner shown in said patent.

What is claimed is:

1. Magnetic recording apparatus for recording first and second valued bits comprising a movable magnetic medium, a magnetic recording head positioned operatively opposite said medium, first time interval generating means for generating a first time interval having a first given time duration, second time interval generating means for generating a second time interval having a second given time duration, recording current generating means connected to said first and second time interval generating means and to said magnetic recording head for transmitting a first polarity current to said magnetic recording head during said first time interval and a second polarity current to said magnetic recording head during said second time interval, control means for controlling said first and second time interval generating means to operate sequentially so that said first time interval is greater than said second time interval when a first valued bit is to be recorded and said first time interval is less than said second time interval when a second valued bit is to be recorded, detecting means for detecting that the bit to be recorded and the bit immediately preceding the bit to be recorded have the same value and changing means responsive to said detecting means for changing one of said first and second time intervals when said detecting means indicates said two bits have the same value.

2. The apparatus of claim 1 wherein said detecting means also detects the bit immediately following the bit to be recorded, and said changing means is responsive to said detecting means for changing one of said time intervals when said detecting means indicates all three of said bits have the same value.

3. The apparatus of claim 2 wherein said changing means increases the duration of said first time interval when all three of said bits have said first value and increases the duration of said second time interval when all three of said bits has said second value.

4. The apparatus of claim 2 wherein said changing means increases the duration of one of said time intervals when all three of said bits have said first value and decreases the duration of said one time interval when all three of said bits have said second value.

5. The apparatus of claim 1 wherein said changing means increases the duration of said first time interval when said two bits have said first value and increases the duration of said second time interval when said two bits have said second value.

6. The apparatus of claim 1 wherein said changing means increases the duration of one of said time intervals when said two bits have said first value and decreases the duration of said one time interval when said two bits have said second value.

* * * * *